Jan. 8, 1963    W. F. RIDENOUR    3,072,253
MACHINE FOR CONVEYING LABELED ARTICLES AND SORTING SAME
Original Filed Oct. 30, 1957    4 Sheets-Sheet 1

Fig. 2.

Jan. 8, 1963 W. F. RIDENOUR 3,072,253
MACHINE FOR CONVEYING LABELED ARTICLES AND SORTING SAME
Original Filed Oct. 30, 1957 4 Sheets-Sheet 3

INVENTOR:
Wayne F. Ridenour
BY
Foley & Lindberg
Attorney

United States Patent Office 3,072,253
Patented Jan. 8, 1963

3,072,253
MACHINE FOR CONVEYING LABELED ARTICLES AND SORTING SAME
Wayne F. Ridenour, Chicago, Ill., assignor to Cheshire, Incorporated, Chicago, Ill., a corporation of Illinois
Continuation of application Ser. No. 693,314, Oct. 30, 1957. This application May 25, 1960, Ser. No. 33,355
17 Claims. (Cl. 209—111.5)

This invention relates generally to apparatus for sorting addressed articles such as magazines, newspapers or the like, and more particularly for sorting the article in accordance with the number of such articles going to a geographical subdivision.

This application is a continuation of application Serial No. 693,314, filed October 30, 1957, now abandoned.

In order to expedite the distribution of nationally circulated or other mass circulated magazines, newspapers or other periodicals it is desirable that they be sorted according to their geographical destination. Oftentimes a large number will go to a large city, so many that more than one bundle goes to such destination. In other cases, to a small city for example, the number to the same destination will be in excess of some minimum amount, and not more than a maximum amount, all to be wrapped as a single bundle. In still other cases, only one and not more than the previously mentioned minimum amount will go to a common geographical subdivision, and in such cases the magazines may either be wrapped individually or as a bundle.

While the Post Office regulations may not require the aforesaid sorting or separation to the degree described above, such may be eminently desirable in the mailing rooms of the publishers of mass circulated periodicals.

The invention herein comprehends the sorting or separating of articles which are labeled with a subscriber's name and address, and for purposes of description only, and not by way of limitation, the articles are designated according to the number going to a particular geographical subdivision. By way of example, where the total number going to a particular subdivision weighs more than fifteen pounds, they are termed "directs." These are separated from the entire group of articles, stacked and tied in bundles not to exceed fifteen pounds each.

A smaller number going to a common subdivision is termed a "club," and is a group of magazines or periodicals more than five in number and weighing in the aggregate less than fifteen pounds.

Another designation is a "single," a "single" being one of a group of less than five magazines going to a zone, village, town, post office or other subdivision. These may be wrapped as a bundle by hand and handled as a unit whether there be one or up to four copies in the bundle. Alternately, they may be wrapped individually.

According to the present invention, mailing pieces such as magazines or periodicals are moved on a conveyor, and each is applied with an address. Each mailing piece, which has been addressed, is then sorted or separated according to whether the magazine is part of a club, a direct or a single. Such separation is effected by scanning an address strip which is provided with suitable indicia, which together with the scanning device and a memory and classifying device enables the magazines after the addressing operation to be delivered to separate conveyors. The individual conveyors receive the addressed mailing pieces according to whether each is a part of a "direct," "club," or "single" as defined above. The "club" and "direct" conveyors include storage device where by proper number of mailing pieces making up such "club" or "direct" are stored prior to being moved upon the conveyor.

With the foregoing considerations in mind it is a principal object of the invention to provide an improved machine for classifying and sorting magazines or the like according to their geographical destination, and furthermore sorting the same according to the number going to a particular geographical destination.

Other objects and important features of the invention will be apparent from a study of the specifications following taken with the drawings which together describe and illustrate a preferred embodiment of the invention, and what is now considered to be the best mode of applying the principles thereof. Other embodiments may be apparent to those having the benefit of the teachings herein, and such other embodiments are intended to be reserved especially as they fall within the scope and purview of the subjoined claims.

Figures 1, 5:
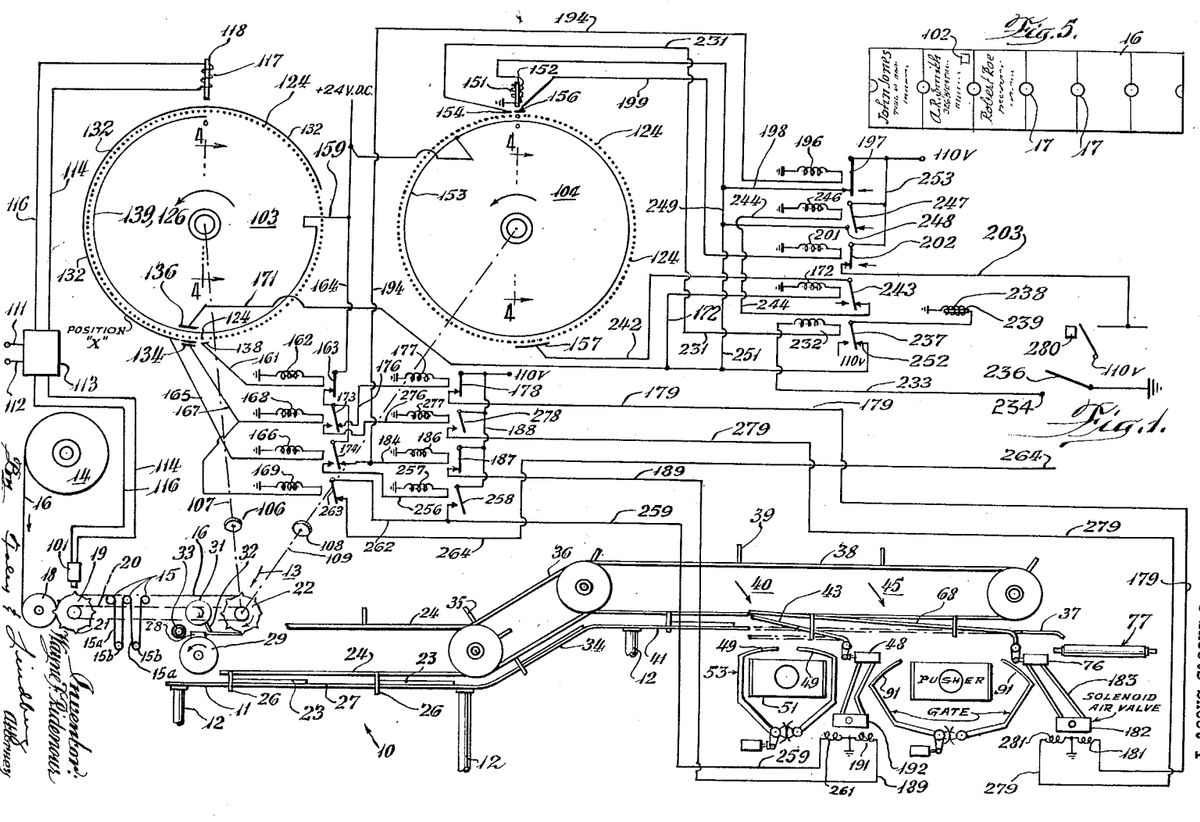
FIG. 1 is a schematic elevational view of a machine having the improvements according to the present invention embodied therein.
FIG. 5 is an address strip adapted for use with the machine seen in FIG. 1.

Referring now particularly to FIG. 1 of the drawings, the apparatus according to the present invention is referred to generally by the reference numeral 10 and includes a table 11 mounted upon legs 12. An address applying head 13 is supported by the table 11 and includes a reel 14 for an address strip which may be of a kind as disclosed in Ridenour Patent No. 2,606,681, issued August 12, 1952 for Machine for Applying Address Labels, or alternately of a form as shown in FIG. 5. The strip is designated by the reference numeral 16 and has regularly spaced perforations 17 therein, the area between each perforation 17 being provided with a suitable subscriber's address.

As seen in FIG. 1, the strip 16 is guided about a guide roller 18 and an auxiliary pin roller 19 having perforation engaging pins 21 extending from the periphery thereof. The strip 16 is guided over stationery guide rolls 15 to hang pendently therebetween as festoons 15a, each festoon 15a including a weighting member 15b, the length of festoons 15a being adjusted for a purpose as will appear. The strip 16 is guided around a pin roller 22 drivably connected with pin roller 19 by a chain 20, the two pin rollers 19 and 22 being driven in accordance with the speed and spacing of regularly spaced magazines or other flat articles 23 moving upon the table 12 by an endless conveyor 24. Conveyor 24 has lugs 26 extending down therefrom and movable in a slot 27 in the table 11, each such lug 26 engaging the trailing edge of the magazine 23 as it moves along the table 11.

The means for operating the conveyor 24 and the addressing head 13 may be of the type as disclosed in the aforementtioned Ridenour patent, and each such article 23 is conveyed past the labeling head 13 by a feed mechanism as shown in said Ridenour patent. The strip 16 is fed by the pin roller 22 to a raised pad 28 of an address label applying vacuum roller 29, the address label being severed individually thereat by a knife roller 31 having knife 32 extending therefrom which severs the strip at the trailing edge of the raised pad 28. The so severed address label is held to the raised pad 28 by vacuum, and while being held to the pad 28 the severed address label moves past a glue applying roller 33 for the application of glue thereto, the label applying roller 29 moving to a position to roll the severed and pasted label to the magazine or periodical 23 as it moves past mailing head 13.

The addressed magazine 23 is then moved onto an auxiliary table 34 by an auxiliary endless conveyor 36, it having lugs 35 which engage the trailing edge of each magazine 23. The article 23 is moved by such auxiliary conveyor to a delivery table 37 and moved therealong by a similar endless conveyor 38 having lugs 39 thereon which engage the trailing edge of the magazine and extend downward in a slot 41 on the table 37.

The delivery table 37 is also mounted upon the legs 12, and is arranged with gates therein whereby the magazines are classified as parts of a "club," a "direct" or as "singles" as defined and described in the general discussion preceding the objects of this invention.

Figure 2:
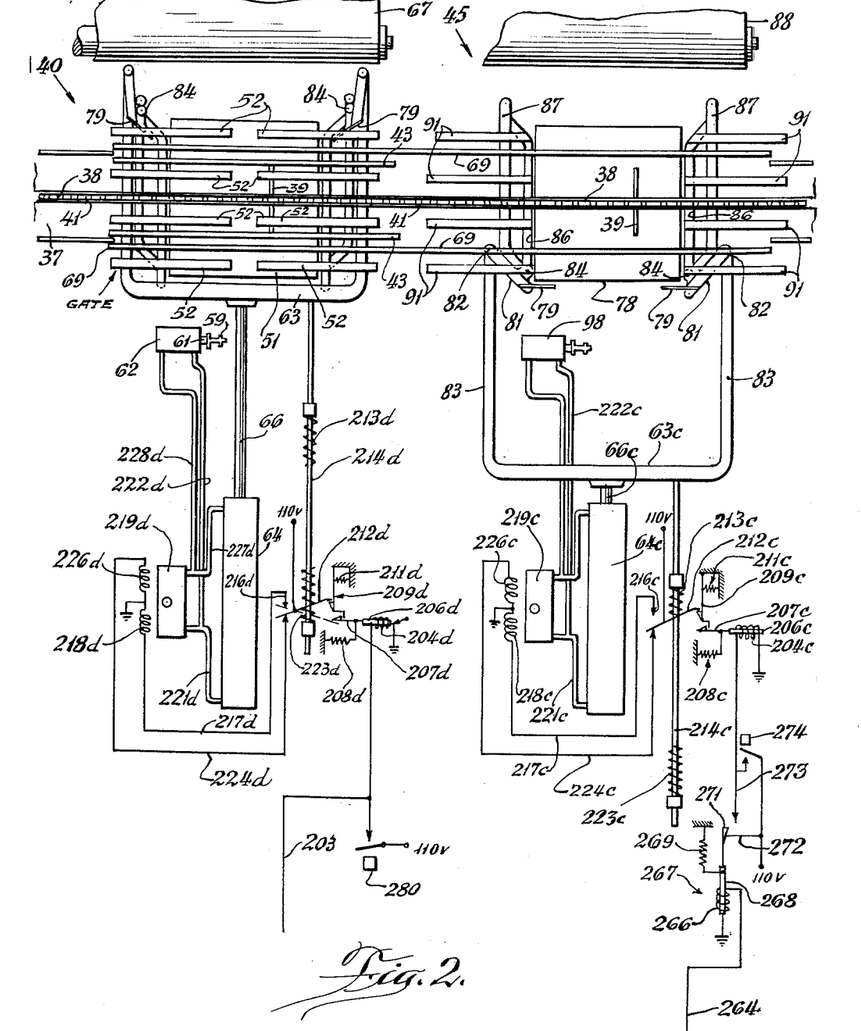
FIG. 2 is a plan view to an enlarged scale of stacking and conveying mechanisms for mailing pieces which are separated in accordance with club and direct classifications, and showing mechanism for controlling the operation of the stackers of such conveyors.
Figure 3:
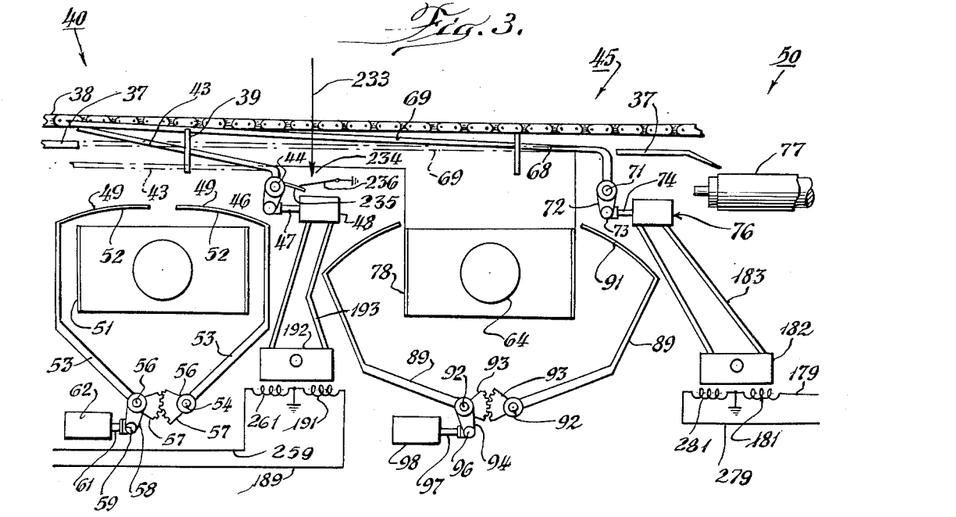
FIG. 3 is a front elevational view of the conveyors seen in FIG. 2, showing details of mechanism for operating the separators for the direct and club classified mailing pieces, and showing a conveyor for the singles.

Referring also to FIGS. 2 and 3, there is shown a direct separator station 40 where the "directs" are stacked and a subsequent club separator station 45 where the "clubs" are stacked, and a singles station 50. As will be described in more detail, the direct and club separator stations include mechanism for stacking a number of magazines before they are moved onto conveying mechanism carrying them away from the machine where they can be conveniently handled. The singles station also includes a conveyor carrying the magazines away from the machine.

Station 40 for the directs includes a direct separator gate 43 which is pivoted on a shaft 44, see FIG. 3. Gate 43 is moved by an operating arm 46 connected to a piston rod 47 of a double acting air operated cylinder 48. Ordinarily direct separator gate 43 occupies the dotted line position shown in FIG. 3 below the plane of the table 37, the gate 43 being moved to the full line position seen in FIG. 3 so that the "directs" can drop onto direct stacker gates 49, 49 in position above a "direct" stacker box 51. Each direct stacker gate 49 includes tines 52, see also FIG. 2, extending from arms 53 rockable about a shaft 54. Each arm 53 has a hub 56 which is integral with a mating gear sector 57. The left hand hub 56 has an arm 58 extending therefrom pivotally connected at 59 to a piston rod 61 of a double acting air operated cylinder 62.

Under conditions as will be described, cylinder 62 is operated to rock the arms 53, 53 and their respective tines 52 out of position above the stacker box 51 so that the "directs" resting on tines 52 will drop into the stacker box 51, tines 52 being maintained in the spaced apart position until a quantity of "directs" not more than fifteen pounds total weight, are stored in the stacker box 51. When the proper number of "directs" are so delivered to the stacker box 51, they are removed therefrom by means of a stack pusher 63 moved to and from ejecting position by means of a double acting air cylinder 64 having a piston rod 66 connected to the pusher 63.

Stacker box 51 seen in FIG. 2 has had its stack removed therefrom by means of the pusher 63, the stack on the stacker box having been delivered to a "direct" delivery conveyor 67. As seen in FIG. 2 the "direct" delivery conveyor 67 is of the endless belt type but it can equally be of the multiple roller and delivery chute type.

Club separator 45 includes a club separator gate 68 having tines 69 which extend as seen in FIGS. 2 and 3 to a point coincident with the leading portions of the "direct" separating gate 43. Each club separator gate 68 is arranged to pivot about a shaft 71, and has an arm 72 hingedly connected at 73 to a piston rod 74 of a double acting air cylinder 76.

When both of the gates 43 and 68 are in the dotted line position seen in FIG. 3, the mailing pieces bypass direct and club stations 40 and 45, and the mailing pieces are conveyed along the table 37 by means of the chain lug 39 to the singles station 50. The singles station 50 includes a conveyor of the type having an endless belt 77 as seen in FIG. 3. Alternately, such conveyor may be of the roller chute type if desired.

During separation of the "clubs," the "direct" separating gate 43 occupies the dotted line position shown and pieces are thus conveyed past the direct separator gate 43 and beneath the tines 69 of "club" separator gate 68, each piece dropping upon a "club" stacker box 78.

By way of broadly explaining the operation of the separator stations, direct separator gate 43 and club separator gate 69 are in the dotted line position seen in FIG. 3 when "singles" are being moved by the conveyor 38 to the singles station 50. When "clubs" are being handled by conveyor 38, gate 68 moves to the solid line position seen in FIG. 3, so that the "clubs" fall into "club" stacker box 78. When "directs" are being handled both gates 43 and 49 are in the raised solid line position, so that the "directs" fall into "direct" stacker box 51. "Direct" gate 43 is never raised unless "club" gate 68 is also raised.

"Club" separator station 45 has a pusher 63c identical to the pusher 63 seen with reference to the "direct" separator station 40. Pusher 63c is arranged to move the stacked articles from the "club" stacker box 78, pusher 63c being moved by double acting air cylinder 64c, there being a pusher rod 66c between the air cylinder 64c and the pusher 63c.

Figures 6, 7:
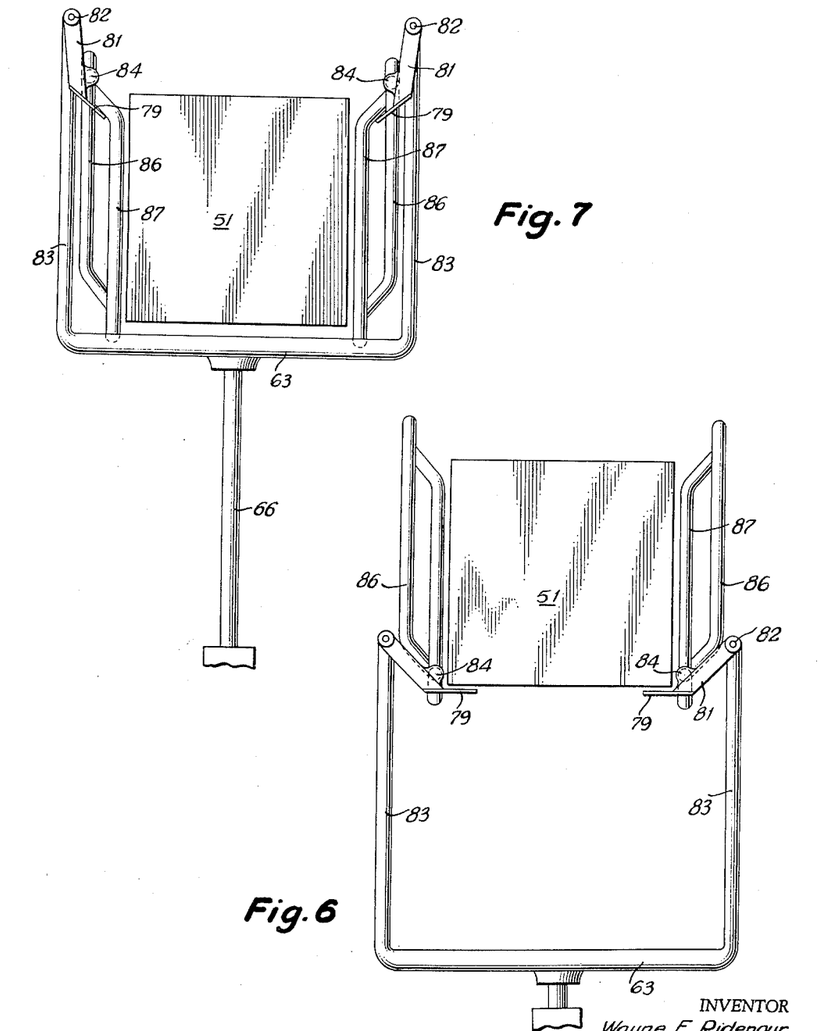
FIG. 6 is a schematic plan view of a pusher device incorporated with the separator seen in FIGS. 2 and 3, showing the pusher device in the retracted position.
FIG. 7 is a schematic plan view similar to FIG. 6, showing the pusher device in extended or discharge position.

Pushers 63 and 63c are each provided with a pair of pusher fingers 79 fixedly mounted at the end of arms 81. Arms 81 in turn are pivotally connected at 82 to the end of push rods 83 of pushers 63 and 63c. Each of the pivoted arms 81 is provided with a guide boss 84 which guides the hinged arms 81 along a grooved path 86 during the forward or ejecting movement of the pusher, the pusher fingers 79 swinging out of position as seen with reference to the pusher for the "direct" separator station 40, the boss 84 upon the return stroke of the pusher 63 following a return groove path 87.

It will be seen that the gate fingers 79 will clear any mailing pieces which have been deposited in the stacker box 51 or 78 after the completion of the clearing operation from such stacker boxes.

The stack of "clubs" thus moved from the stacker box 78 are arranged to move upon a "club" conveyor 88 similar to the conveyor 67 for the "directs" previously described.

As with the "direct" separation station 40 the "club" separation station 45 is arranged to store "clubs" while the pusher is removing the stack from the stacker box 78. As seen in FIG. 2, a new stack of "clubs" can be held in position by means of "club" stacker gates 89 having tines 91 arranged to overlie the stacker box 78 and spaced therebetween. Each of the gates 89 is pivoted about a shaft 92, and each has a meshing gear sector 93. As seen in FIG. 3, one of the gates 89 has an arm 94 hingedly connected at 96 to a piston rod 97 of a double acting air cylinder 98 which rocks the gates 89 to a position where the "clubs" can freely move into the stacker box 78, or if "clubs" are held in position on the tines 91 they subsequently can be dropped into "club" stacker box 78 by opening movement of the tines 91.

Means are provided for sensing the mailing strip 16 seen in FIG. 5 to determine whether the mailing pieces are to be separated at the respective "direct" and "club" stations 40 and 45, or whether the "singles" will be moved past the "direct" and "club" stations 40 and 45 to the "singles" conveyor 77 at the singles station 50. To this end there is provided a detector 101 arranged to sense a mark 102 on the strip 16.

Detector 101 senses the strip 16 at a point well before the position where physical separation of the magazines into three classifications is made. The point at which the strip 16 is sensed is equal to or greater than the number of mailing pieces in a fifteen pound maximum weight "direct" stack. Mailing pieces of the smaller type, such as pocket size magazines, will have a larger number in a fifteen pound stack than the larger standard size magazine. The festoons 15a are adjusted in length according to the number of magazines in a stack of fifteen pounds, so that the sensing of the strip 16 is done at a point that will take into consideration the number of books comprising a "direct."

The sensing of the strip 16 is done at the end of a group of magazines going to any one geographical subdivision. However, the actuation of the separator gates at the separator stations 40 and 45 is delayed by the time interval required for the strip to move from the sensing position at detector 101 to the addressing head 13 plus the time of transport by the conveyors shown to the separator stations. In other words, sensing is done on the tape 16 of the last of the members of a group (directs, clubs or singles), but the actual separation does not occur until the appropriately addressed magazine is in position beyond the addressing head and just at the separating stations 40 and 45.

Means are accordingly provided in the form of a memory circuit which records the passage of the mark 102 indicating a change in the geographical designation (for convenience sake called a "town marker"), and which together with a counting circuit determines the actuation of the separator stations 40 and 45. Such means for controlling the separation of the mailing pieces will now be described.

The detector 101 and the mark 102 may be arranged to operate photoelectrically or magnetically, or by means of electrical contact where the mark 102 is a notch or perforation in the strip 16. As contemplated herein, the detector 101 is preferably arranged to sense the different intensity of a beam of light reflected from the strip 16 as would be occasioned by a black dot upon the strip 16, for example.

Figure 4:
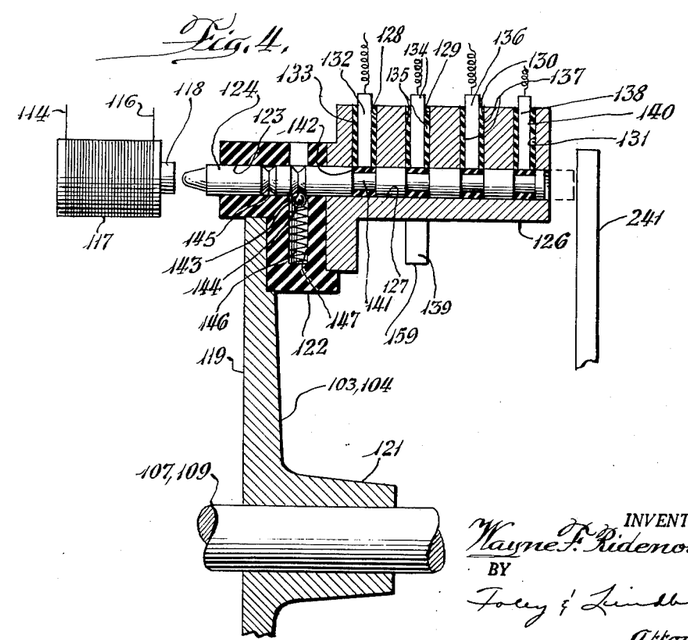
FIG. 4 is a detailed cross sectional view through a memory device and counter for the mailing pieces moved by the machine seen in FIGS. 1 to 3.

The detector 101 cooperates with a memory disk 103, see also FIG. 4, and a counter disk 104, substantially identical with the memory disk 103. For purposes of description herein, both the memory disk 103 and the counter disk 104 are arranged to be driven by the pin roller 22, and to advance an increment angularly corresponding to the advance of the pin roller 22, a distance which corresponds to the distance between perforations 17 of the strip 16.

In the example described, each of the memory disks 103 and 104 is arranged to rotate one-one hundred twentieth (1/120) of a revolution for each individual address. Since the pin roller 22 has eight pins thereon, it advances one-eighth (1/8) of a revolution for each address. A reducing drive 106 is interposed in a mechanical connection 107 between the pin roller 22 and the memory disk 103. A similar reducing drive 108 is interposed in a mechanical connection 109 between the pin roller 22 and the counter disk 104.

Referring again to FIG. 1, the detector 101 receives energy from a pair of power leads 111 and 112 connected to a control box 113. The detector 101 is connected in a pair of leads 114 and 116 branching from control box 113, said leads in turn being connected to opposite ends of a solenoid winding 117, the energization of the winding 117 causing movement of its armature 118, see also FIG. 4.

The detector 101 thus senses the mark 102 designating the start of a new geographical subdivision, be it a zone, village, town or other. The presence of the mark 102 causes the detector 101 to energize the solenoid winding 117, thereby moving its armature 118. Referring now to FIG. 4, the memory disk 103, which is typical also of the counter disk 104, consists of a circular plate 119 having a hub 121 fast to the mechanical shaft connection 107. The circular plate 119 supports an annular insulating ring 122 having one hundred twenty (120) equally spaced bores 123. Each of the bores 123 receives a pin or plunger 124 adapted to be moved in the bore 123 by means of the armature 118 of the solenoid 117. An annular collector ring 126 likewise is provided with bores 127, coaxial with the bores 123 in the insulating ring 122, there being one hundred twenty (120) such bores 127 to receive the pin or plunger 124. The collector ring 126 is provided with a plurality of circumferentially extending slots 128, 129, 130 and 131, slot 128 retaining a "club" brush 132 which is insulated from the walls of the slot 128 by insulating disks 133. A "singles" brush 134 is retained within the slot 129 and is insulated therefrom by means of insulating disks 135. An auxiliary brush 136 is retained within annular slot 130 and is insulated from the walls thereof by insulation 137. A "triggering" brush 138 is retained within the slot 131 and is insulated from the collector ring 126 by insulating disks 140.

The collector ring 126 has a brush 139 bearing against the inner face thereof, brush 139 being connected to a low voltage supply, preferably of the order of twenty four volts (24 v. D.C.) and a circuit can be completed, under conditions as will be described, from the supply brush 139 to the respective brushes 132, 134, 136 and 138 when the solenoid armature 118 is moved to the right as seen in FIG. 4. The plunger 124 has spaced portions of reduced diameter 141, each such portions being surrounded by an insulating sleeve 142, each such insulating sleeve being in register with the brushes 132, 134, 136 and 138 when the plunger is in the position seen in FIG. 4, the circuit including the brush 139 at such time being opened.

The plunger 124 has a pair of spaced detent slots 145 and 143 which cooperate with a ball detent 144 urged against the slots 142 and 143 by means of a spring 146 held in a radially extending slot 147.

It should be noted that FIG. 4 is a typical section through the memory disk 103 and the counter disk 104, particularly the memory disk 103, and it should be borne in mind that the brushes 132, 134, 136, 138 and 139 remain in the stationary position while the memory disk rotates with the mechanical drive connections 107 and 109.

Club brush 132, singles brush 134, auxiliary brush 136 and triggering brush 138 are mounted in fixed relationship to each other, but must be adjustable in a rotary direction as a unit, so that the number of plungers 124 between a zero position at the solenoid 117 and the triggering brush 138 is equal to the number of mailing pieces in a maximum size "direct" weighing not more than fifteen pounds. Brushes 132, 134, 136 and 138 do not rotate with the memory disk 103, but are fixed in position and by reason of the slots accommodating each brush, the disk 103 is enabled thus to rotate. It will be understood that the brushes 132, 134 and 136 are arranged to contact more than one of the plungers 124 at a time, and as seen in FIG. 4, these brushes extend as arcuate segments in their respective slots in annular collector disk 126. As seen in FIG. 1, "singles" brush 134 is an arcuate segment within its slot 129, and is of a length so as to lap three contiguous plungers 124. Triggering brush 138, however, contacts but one pin 124 at a time. It is arranged with "singles" brush 134 to overlap four contiguous pins 124, thus equal to the maximum number (four) of mailing pieces permitted for a town group in which each mailing piece must be wrapped individually.

The number of plungers 124 between the zero position at solenoid 117 and the plunger preceding the "singles"

brush 134, as seen in FIG. 1, indicate the possible variation in the size of the "club" stack delivered to the stacker box 78 at the "club" separator station 45. The auxiliary brush 136 controls the minimum size of the last stack of "directs" made up of more than one stack of a maximum size of fifteen pounds, and is normally set at five. Where the mailing pieces are of large size as explained above this number will have to be reduced, so that the length of the auxiliary brush 136 must be adjustable.

If this number is greater than the minimum number of mailing pieces in a "direct" the inner supply brush 139 must be shortened, as will be described.

Counter disk 104 is constructed in a fashion similar to the memory disk 103, and it likewise is provided with a solenoid 151 having a movable armature 152 which moves the plunger 124 of counting disk 104 to the right as seen in FIG. 4, to the dotted line position to cause a circuit between a supply brush 153 similar to the supply brush 139 of memory disk 103, and a clearing brush 154, a stacker brush 156 and a reset brush 157. The closing of circuits through said brushes occurs under conditions as will be described.

In operating the machine according to the present invention, a leader of blank labels is attached to the leading end of the label strip seen in FIG. 5. The length of this leader is determined by the maximum number of mailing pieces in the "direct" stack. The leader, not shown, is threaded through the addressing head 13 and around the pin rollers 19 and 22. As seen in FIG. 1, the strip is threaded around the idler rollers 15 and the festoon rollers 15b. The last label of the leader is printed with a town marker 102 and when marker 102 is under the detector 101 the plunger 124 at the zero position of the memory disk 103 is displaced by the armature 118 of the solenoid 117.

It may be noted that the town markers 102 are always made as a part of the last label of a town group, rather than the first, since in this position the marker will be exposed on the top of the last stack of a "direct" delivered to the stacker box 51 of the "direct" separator station 40 seen in FIG. 3. This will serve as a visual separation also between "directs" should the last stack of a "direct" be the same size as the other stacks. This will eliminate the necessity of the mailer or operator to read the labels to make "direct" separation on the stack conveyor 67 seen in FIG. 2.

At the conclusion of the threading of the leader, as just described, it is run past the addressing head 13 until the first address label is in position for its application to a mailing piece 23 seen in FIG. 1. During this running out operation of the leader, magazines are not fed by the feed mechanism.

The aforesaid preliminary operation of the machine will advance the displaced plunger 124 of the memory disk 103, see also FIG. 5, and as the memory disk 103 revolves with the pin roller 22 the displaced plunger 124 will eventually make contact with the triggering brush 138. Upon such contact the first mailing piece should be in a position in front of the separation stations 40 and 45 seen in FIGS. 2 and 3, to be diverted into the stacker box 51 or 78, or to move onto "singles" conveyor 77 according to whether the "direct" separator gate 43 and "club" separator gate 68 are in the lifted position seen in FIG. 3, or whether the "club" separator gate 68 alone is in a lifted position. It will be remembered that "club" gate 43 can be in the closed or dotted line position. If both gates 43 and 68 are down, the "singles" move past the stations 40 and 45 to "singles" conveyor 77.

When the actuated plunger 124 makes contact with triggering brush 138, a circuit will be made from the supply brush 139 which is connected by a lead 159 to a source at low potential preferably of the order of 24 v. D.C. The circuit is completed through the supply brush 139, collector ring 126, plunger 124 and the triggering brush 138 by means of a lead 161 and a relay winding 162 to ground. When relay 162 is energized contacts 163 thereof close, contacts 163 being connected to a lead 164 branching from the 24 v. D.C. power source shown. The closing of contacts 163 is adapted to place a control network, as will now be described, in a condition whereby separation will be effected at stations 40, 45 and 50 seen in FIG. 3.

For purposes of description hereat it may be assumed that the strip 16 has moved past the detector 101, and that no other town marker 102 on the strip 16 has been sensed by detector 101, indicating that since the incidence of the first such town marker 102 all of the mailing pieces are to be directed to the same destination. There being no further town marker up to this point, detector 101 will not energize the relay 117 to displace another plunger 124 on the memory disk 103 seen in FIG. 4. For purposes of description at this point it will be assumed that all of the mailing pieces starting within the first detecting cycle by the detector 101 are part of a "direct."

It may be noted that the distance between the pin rollers 19 and 22 at mailing head 13 together with the length of the festoons 15a is such as to mark the number of magazines in a "direct" totaling not more than fifteen pounds. It will be remembered that the "directs" are to be stacked in the stacker box 51, and "direct" separator station 40 is arranged to stack not more than fifteen pounds in any given stack before such stack is moved to the stacker conveyor 67.

The position of the triggering brush 138 with reference to the zero position where the solenoid 117 is located is in accordance with the number of pieces making up a stack of "directs" of not more than the total weight of fifteen pounds. In instances where the stack of "directs" is too tall to be handled conveniently, for a fifteen pound total weight, by reason of the dimensions of the mailing piece, the triggering brush 138 may be adjusted in its position with respect to the zero position at the solenoid 117.

The actuated plunger 124 which has been moved by the solenoid 117 and which turns with the memory disk 103 will during such rotation make contact with the "club" brush 132, the singles brush 134, and the "auxiliary" brush 136. All of these brushes are held stationary while the memory disk 103 rotates.

The brushes at the memory disk 103 are connected to relays in circuits controlling the operation of the separator stations 40 and 45. "Club" brush 132 is connected by a lead 165 to a relay winding 166; "singles" brush 134 is connected by a lead 167 to a pair of relay windings 168 and 169 connected in parallel. The auxiliary brush 136 is connected by a lead 171 to a relay winding 172.

For purposes of convenience the circuits are all shown as being made through the various elements thereof to a common ground, all of the control circuits previously described being at a low potential of the order of 24 v. D.C.

The actuated plunger 124 in moving from the zero position at the solenoid 117 to the triggering brush 138 would ordinarily energize the relay windings 166, 168, 169 and 172 as the plunger 124 moves past their respective brushes. However, these relay windings and the circuits controlled thereby are under the control of the triggering relay 162 and contacts 163 operated thereby. Triggering relay 162 is the last to be energized by the plunger 124 in its movement with memory disk 103. Since plunger 124 has moved past brushes 132, 134 and 136 and out of contact therewith, their respective relays will not be energized.

Provided no other town marker 102 has been sensed at the detector 101, the only relay energized by contact of the plunger 124 with the triggering brush 138 is relay 162. Relay windings 168 and 166 being de-energized at this time, their respective contacts 173 and 174 will be in the position shown in FIG. 1. Contact 173 is connected in series with contact 163, and closes a circuit through a lead 176 and a relay winding 177. When relay 177 is energized it closes its contact 178 connected to a 110 v. A.C. source as shown. Contact 178 is connected in a lead 179 to a winding 181 of a solenoid operated air valve 182, see also FIGS. 2 and 3.

Air valve 182 has an air line 183 connected to the double acting cylinder 76 to lift the "club" separator gate 68 as seen in FIGS. 1 and 3. Details of construction of the air valve 182 are not shown, as their construction and operation are well within the skill of one in the art.

Contact 174 is also connected in series with trigger relay contact 163 and to a lead 184 in turn connected to a relay winding 186. Its contact 187 is connected by a lead 188 to the 110 v. A.C. source and by a lead 189 to a winding 191 of a solenoid operated air valve 192, see also FIG. 3. When the winding 191 is energized, air will be admitted to a line 193 to open the "direct" separator gate 43 seen in FIGS. 1 and 3.

It will be seen that when gates 43 and 68 are in the raised position seen in FIGS. 1 and 3 the mailing pieces will be dropped down to the "direct" stacker 51. It may be noted that "direct" stacker gate 49 will be open, in a position corresponding to "club" stacker gate 91, rather than closed. Circuitry for controlling the movement of the stacker gate with the movement of the "direct" and "club" separators, and the cycling of the stacker box ejector including the counter disk 104 will be described.

Relay 166 at this time is de-energized, and its contact 174 will be in the position shown in FIG. 1. A circuit is made through contact 174 including a lead 194 to energize a relay winding 196 controlling the operation of counter solenoid 151. Contact 197 operated by relay 196 is connected to the 110 v. source shown, and to a lead 198 to the solenoid 151 to move the armature 152 thereof and displace pin or plunger 124 in the counter disk 104. The pin or plunger 124 of the counter disk 104 is substantially as shown in FIG. 4 for the memory disk 103. Plunger 124 of counter disk 104 likewise causes circuits to be completed from the power brush 153 to the clearing brush 154, the stacker brush 156, and the reset brush 157. It may be noted that the plunger 124 of the counter disk 104 has three instead of four circumferential slots for the brushes thereof as compared to the memory disk 103.

When the pin 124 is moved by the plunger 152 at the start of the counting, which occurs when the plunger 124 of the memory disk 103 closes the circuit at the trigger brush 138 thereof, the actuated pin or plunger 124 of the counter disk 104 will close the circuit between the supply brush 153 and the stacker brush 156. A lead 199 contacts stacker brush 156 to a relay winding 201, which when energized closes a contact 202 connected between the 110 volt source and a lead 203 to a solenoid winding 204d having an armature 206d, see FIG. 2. Solenoid winding 204d and its armature 206d are effective to initiate and complete a clearing cycle of "direct" stacker box 51 and operation of "direct" stacker gate 49.

However, the "direct" separator station 40 would be in a position corresponding to the position of the pusher 63c for the "club" pusher and "club" stacking gate 91 of "club" separator station 45. The operation of the pusher 63c for "club" separator station 45 in its movement to clear a stack from the stacker box 78 will now be described, and the operation of the pusher 63c in returning to the start position will be described for the "direct" separator station 40. The pusher for the "direct" station 40 is shown in the position where the pusher has removed a stack from the stacker box 51 of the "direct" separator station 40. Parts referring to both such stations and common thereto will be referred to by the same reference numeral for purposes of simplicity in describing the invention.

Numbers for "club" separator station 45 will be followed by suffix letter "c" while numbers for "direct" separator station 40 will be followed by suffix letter "d."

When solenoid armature 206c is actuated, it pulls a pawl-type latch 207c against the force of a spring 208c. Movement of the latch 207c causes a latch 209c to move against the force of a spring 211c. A toggle switch 212c is rocked by a spring 213c supported by a control rod 214c onto a contact 216c to close a circuit with the 110 v. source by means of a lead 217c connected to a solenoid winding 218c of a solenoid actuated air valve 219c. The energization of the winding 218c causes air to be directed by a line 221c to the double acting air cylinder 64c to cause the pusher 63c to moved to a stack removing position of its cycle of movement.

Coincident with the supply of air to the cylinder 64c, air is supplied by a line 222c to the cylinder 98 operating the stacker gate 89. Normally the stacker gates 89 are open but when air is supplied to lines 222c or 222d the corresponding air cylinders (62 or 98) will close the corresponding gates 49 or 89.

The return stroke of the stacker pusher is shown with respect to the "direct" separator station 40, which pusher is in the start of its return movement. When the pusher has reached the end of its stroke for unloading, a spring 223d on the other end of the control rod 214d will rock the toggle switch arm 212d to the full line position. The latch 209d at this time holds the toggle arm 212d in place. Since the actuated plunger 124 of counter 104 has by this time moved past the stacker brush 156, solenoid 204d will be de-energized enabling the toggle arm 212d to be latched as shown at separator station 40. When the toggle arm 212d takes the full line position seen with respect to the "direct" separator station 40, a circuit will be made from the 110 v. source shown through arm 212d and including a lead 224d and a solenoid winding 226d of the solenoid valve 219d.

Air will then be supplied to a line 227d to reverse the operation of the double acting cylinder 64, air at the same time also being supplied by a branching line 228d from the line 227d to operate the gate cylinder 62 in the opposite direction and open the stacker gate 49.

The pusher blades 79 move across the stacker box 51 in the ejecting part of their cycle of operation, moving out of the way by reason of the return track 87 so that upon return along the track 87 the mailing pieces can fall freely upon the stacker box 51 by reason of the gates 49 now being in the open position.

The latch 209d returns to a latching position and it cannot be released unless the solenoid 204 is again energized, so that the pawl-type latch 207d can once more engage therewith. The latch 207d on the pusher solenoid 204d thus prevents the pusher 63 and the pusher gates 79 from re-cycling in the event the solenoid 204 remains energized by reason of an interruption in the rotation of the counter disk 104 when the strip throwout on the labeling head 13 operates. Such a throwout is described in more detail in the aforesaid Ridenour patent, and need not be described in further detail herein.

Referring back to the counter disk 104, the plunger 124 first makes contact with the clearing brush 154, it being connected in a lead 231 to a relay winding 232, the opposite end of the relay winding 232 being connected by a lead 233 to switch contacts 234, see FIGS. 1 and 3. An actuator 235 on operating arm 45 actuates a switch arm 236 cooperates with the switch contact 234 to close the circuit through the winding 232 only when the "direct" separator gate 43 is in the down or dotted line position seen in FIG. 3. However, in the assumed condition of operation all of the mailing pieces are part of a group of "directs" and it will be remembered that during such condition the "direct" separator gate 43 is in the up position seen in FIG. 3 thereby maintaining the relay 232 de-energized.

If relay 232 is energized by reason of the closing of switch contact 234, see FIG. 3, as would be occasioned by only "clubs" or singles moving past the "direct" station 40, a contact 237 of relay 232 will close a circuit to the 110 v. supply shown to energize a clearing solenoid 238 having a movable armature 239. Referring to FIG. 4, armature 239 would actuate a clearing arm 241 to shift plunger 124 of the counter disk 104 to the unactuated or solid line position.

However, if the mailing pieces 23 moving on the tables 27 and 37 are still part of a group of "directs" the switch 236 of FIGS. 1 and 3 will be in the open position and the relay winding 232 will not be energized. In such an event, and with "directs" still moving past the detector 110, the already actuated plunger 124 of the rotating counter disk 104 will continue its movement therewith until it contacts the reset brush 157. Reset brush 157 is connected by a lead 242 to contact 243 of relay winding 172, the contact 243 being in circuit with a lead 244 connected to a relay winding 246, which when energized closes contacts 247 and 248. A lead 249 is connected to contacts 247 and 248 and to the solenoid winding 152 to displace another pin 124, see again FIG. 4. Reset brush 157 is adjusted in its position according to number of pieces in a stack of "direct."

The aforesaid operation, which assumes the continuing movement of "directs," one more will cycle the direct gate 43 to the position seen in FIG. 3, the pusher 63 of the stacker box 51 operating to eject the stack in "direct" stacker box 51 to the "direct" conveyor 67.

The circuit through the counter solenoid 151 is in parallel with a circuit including a lead 251 connected to a contact 252 of relay 232. This parallel circuit is energized by a 110 v. source connected by a lead 253 to the contact 247 to clear any previously actuated plunger 124 on the counter disk 104 except the one just displaced by the counter solenoid 151.

It should be borne in mind that counter disk 104 merely ticks off the members of a group and determines the cycling of the separator stations. If there are a large number of "directs," a quantity requiring more than one cycling of the gates at "direct" separator station, there ultimately reaches a point where the residual number of "directs" of a group are less than a number marking a desired stack of directs. This residual number, if greater than five, causes cycling of the gates at the separator station to form another stack. If less, the gates are not cycled and the remainder is piled on the last previously made stack of directs.

The counter disk 104, however, does not store information as to the number remaining in a group. The memory disk 103, it will be recalled, marks the end of a group, the town marker 102, see FIG. 5, causing solenoid 118 to actuate plunger 124 of memory disk 103. As it rotates with disk 103 it ultimately reaches a position with respect to auxiliary brush 136 to determine whether there are five or more pieces remaining.

At the time actuated plunger 124 of the counter disk 104 first makes contact with reset brush 157, auxiliary brush 136 of memory disk 103 determines whether or not fewer than five mailing pieces remain in the "direct" group. If there are five or more remaining, a new stack will be started at stacker box 51 of the "direct" separator station 49. If there are less than five in the remainder of the "direct" group, they are added to the stack of "directs" already in stacker pocket 51 as will now be described.

If at this time a depressed plunger 124 of memory disk 103 is in contact with auxiliary brush 136, indicating less than five pieces remaining in such group of "directs," relay 172 will be energized, moving the contact 243 thereof to the open position. This will open the circuit to relay winding 246 to move the contact 247 thereof to the open position seen, thereby de-energizing the circuit through the counter solenoid 151. Since the counter solenoid will not be energized as would be the normal case, the remaining "directs" will move into the stacker box 51 to be added to the stack of "directs" therein.

However, as soon as the actuated plunger 124 of memory disk 103 advances beyond the auxiliary brush 136 the circuit to relay 172 will be opened, contact 243 thereof moving to the position shown in FIG. 1 once more to energize relay 246, its contacts 247 moving to contact 248, the circuit through solenoid 151 being energized once more to eject the stack of "directs" at stacker box 51.

Ordinarily this would necessitate a lengthening of reset brush 157, but under normal conditions if the reset circuit including contact 243 and relay winding remains energized for five cycles, it would maintain counter solenoid 151 in an energized condition to continue to depress a plunger 124 each time it reached the zero position at the solenoid 151. The aforesaid condition is prevented, however, by the clearing solenoid 238 and its armature 241, which clears all of the actuated pins excepting the one which is being displaced at the zero position where the counter solenoid 151 is located.

Consider now the conditions obtaining when one group of "directs" is followed by another group of "directs."

All of the circuitry incident to the scanning by the town detector 101 still obtains to actuate solenoid 117 of memory disk 103. When the memory disk 103 rotates to a position where the actuated plunger 124 contacts triggering brush 138 as already described, relay 162 will be energized to close the circuit through contact 163 of relay 162. When relay 162 is energized, plunger 124 of counter 104 will be actuated to close the circuit through relay winding 201 and its contact 202. "Direct" separator gate 49 will then cycle to the closed position seen in FIG. 3 and the pusher 63 of "direct" stacker box 51 will eject the last stack of the "directs" therein and start the succeeding stack of "directs" on top of the tines 52 of "direct" separator gate 49.

It will be remembered that the triggering brush 138 is controlling of the auxiliary brush 136, the "club" brush 132 and the "singles" brush 134. These control respectively, as has been previously described, relay windings 166, 168 and 169, said windings being energized before the triggering relay 162 is energized. However, when plunger 124 is in contact with triggering relay 162, relays 166, 168 and 169 are not energized. There being no "singles" or "clubs" with town markers 102 on strip 16 to actuate solenoid 117 there is no contact made of an actuated plunger with a "singles" brush 134 or a "club" brush 132, and the circuits described with reference to start of the operation where a group of "directs" are being fed will still obtain. Accordingly, a circuit will be made through the relay 177 to close its contact 178 to a 110 v. source. Contact 178 is connected in a lead 179 to operate solenoid valve 182 and raise the "club" separator gate 68. At the same time, the counter solenoid 151 is actuated when relay 196 is energized, it being energized when relay 162 is energized and relay 166 is de-energized, relay 196 being connected by the lead 194 to contact 174.

When counter solenoid 151 is energized by relay 196 the circuit closed at the stacker brush 156 will energize relay winding 201, its contact 202 being connected in the circuit with lead 203 and including the winding 204d controlling the operation of the solenoid operated air valve 219d, see FIG. 2, to eject the last stack of the preceding "direct." As has been noted previously, this last stack may be less than a full stack, a full stack, or a stack with one to four extra copies. In the last two cases, a circuit will be made at the counter solenoid 151 through the relay 246, but since contact 247 of relay 246 is connected in parallel with contact 197 of relay 196 and is actuated by the triggering brush 138 of memory disk 103 energizing relay 172 this latter condition is of no consequence.

If the last stack of the preceding "direct" is less than the full number for which the counter disk 104 and reset brush 157 is set, that is, if there is a displaced plunger between the zero position and reset brush 157 on counter disk 104 at the time the circuit for the new "direct" is received at the triggering brush 138 at memory disk 103, solenoid 238 for clearing counter 104 will return this plunger to its unactuated position, so that it will not interfere with the count of the new "direct."

If the "direct" is followed by a "club" or "single," "direct" separator gate 43 will be closed. The closed position corresponds to the dotted line position seen in FIGS. 1 and 3. The presence, of course, of a "club" or "single" following such previously described "direct" is marked on the strip 16 shown in FIG. 5 by the town marker 102. Such marker it will be remembered, comes at the end of such "club" or at the "single." In any event, the detector 101 causes the solenoid plunger 117 to actuate a plunger pin 124 on the memory disk 103. Upon being actuated, it closes the circuit at the "club" brush 132 connected by the lead 165 to relay winding 166. When the contact 174 thereof moves from the position shown, relay winding 196 connected in the lead 194 will be de-energized. The circuit through its contact 197 will then open, and the counter solenoid 151 de-energized. Any previously actuated plunger 124 of counter disk 104 will continue in its rotation toward the reset brush 157, although no more mailing pieces are being received by the stacker 51 at the "direct" separating station 40. Such previously actuated pin 124 will merely re-cycle the stacker at station 40, although no mailing pieces are being diverted at this station.

The closing of the circuit through the "club" brush 132, which energizes the relay 166 also causes the contact 174 thereof to close a circuit including a lead 256 and a relay winding 257. Its contact 258 is connected in the lead 188 from the 110 v. source, and in a line 259 to a winding 261 of the solenoid valve 192. This will operate the gate 43 in the opposite direction and close same to the dotted line position shown in FIGS. 1 and 3.

Referring back to the counter disk 104 and the last displaced plunger 124, thereon, which marked the last of the group comprising the last previous "direct," such plunger 124 will move with the rotation of counter disk 104 until it contacts reset brush 157. It will be remembered that the "direct" gate 43 is in the down position, no more magazines being received by the stacker box 51 at the "direct" separator station 40. When the actuated plunger 124 of counter disk 104 closes the circuit through the reset brush 157, relay 246 will be energized causing its contact 247 connected in lead 249 to energize counter solenoid 151 and displace a plunger 124 at counter disk 104.

At the same time this newly actuated plunger is actuated, stacker brush 156 will close a circuit through relay 201 connected in the lead 199. Closed contact 202 of relay 201, connected in the lead 203, will now cause the gate and pushers for "direct" separating station 40 to clear the last stack of the "directs" in stacker box 51 thereat.

However, as the counter disk 104 rotates, the next one hundred twentieth (1/120) turn of the actuated plunger 124 will contact clearing brush 154 connected in the lead 231 to the relay winding 232, it being connected in lead 233 through the switch contacts 234 and 236 to ground, see also FIG. 3. It wil be remembered that the "direct" gate 43 is now closed, thereby to energize the relay 232 and move its contact 237 to make a circuit with the 110 v. source shown to energize the clearing solenoid 238. When solenoid 238 is energized, the counter disk 104 will be cleared so that the stacking for "directs" is inactive at the "direct" separating station 40 until another signal is received from the memory disk 103 to start another stack of "directs."

A condition may arise where the last stack of a "direct" is less than a full count, and such "direct" is followed by a small "club" or a few "singles." In such case it is possible that the counter 104 may receive a signal for a new "direct" from the triggering brush 138 at the memory disk 103 before the last actuated plunger on the counter disk 104 for the preceding "direct" has arrived at reset brush 157 of counter disk 104. In such an event the circuit made by the triggering brush relay 162 will cause the plunger 124 at the zero position of counter disk 104 to be actuated by the counter solenoid 151, it being energized by relay 196, which at this time is controlled by the trigger relay 162. In such an event, and as previously described, the actuated plunger at the zero position of counter disk 104 will close the circuit through the stacker brush 156 to clear stacker pocket 51 at the "direct" separating station 40.

Referring back to memory disk 103, the circuits obtaining when the apparatus is processing "clubs" will now be described.

When an actuated plunger in the memory disk 103 reaches the triggering brush 138 and there is another actuated plunger between the zero position thereof at the memory disk solenoid 117 but not within four positions directly preceding the triggering position at triggering brush 138, such actuated plunger will indicate that a "club" is to be separated. It will be remembered that the town marker 102 on the address tape 16 of FIG. 5 will control the operation of the detector 101 and the memory solenoid 117. This second actuated plunger, marking a "club" will close a circuit from the supply brush 139 and through the club brush 132. Relay winding 166 connected by lead 164 to the "club" brush 132 will thereby be energized, to cause its contact 174 to move to the other contact shown.

It will be remembered that relay 166 was also actuated at the time a previously actuated plunger 124 now in position at the triggering brush 138 was actuated. Just prior to such plunger reaching the triggering brush 138, relay 168 connected by the lead 167 to the "singles" brush 134 was also actuated, but both of the circuits through the "club" relay 166 and "singles" relay 168 were opened by such pin 124 as it moved to the triggering position at the triggering brush 138. "Singles" relay 168 thereupon returned to the position seen in FIG. 1, but club relay 166 remained energized by the following actuated plunger which may be assumed as being at a position marked "X."

Relay 162 being energized, and relay 168 at this time being de-energized, a circuit will be made through the contacts 163 and 173 to energize the relay 177. As was described previously, a circuit will be made through contact 178 and lead 179 to winding 181 of the solenoid valve 182, thereby maintaining the "club" gate 68 in the open position shown. Relay 166 being energized, a circuit will be made through its contact 174 and lead 256 to energize the relay winding 257. Its contact 258 connected in the lead 259 will energize winding 261 of solenoid valve 192 maintaining "direct" gate 43 closed as previously described.

At the same time a parallel circuit is made including the contact 258 and including a lead 262 connected in circuit with a contact 263 of relay 169. A lead 264 is connected to contact 263 and to a winding 266 of a "club" delay switch 267, see FIG. 2. Armature 268 of the winding 266 is opposed by a spring 269, and the armature 268 operates a latch 271 to connect the 110 v. source contact 272 to a lead 273. The lead 273 is connected to the solenoid winding 204c of the "club" separator station 45 to initiate a clearing cycle to clear the last club at the stacker box 78 at the "club" separator station 45. Club separator station 45 is shown at the start of a cycle to eject a stack of "clubs" from the stacker box 78.

Referring back to FIG. 1, as the actuated plunger 124 at the triggering brush 138 leaves such triggering brush in the next cycle, the circuits to solenoid 266 of the "club" delay switch will be opened at contact 163 of relay 162, now de-energized. Spring 269 will return contact 272 to the open condition, and "club" gate 89, see also FIG. 3, will move to the closed position corresponding to the gate of the "direct" separator station 40 to eject the last club in stacker box 78. The "club" stacker gate thereafter will move into the open position shown to receive a new "club."

Club delay switch 267 is accordingly necessary to delay the action of the "club" separator gate 89 an amount of time equal to one cycle, since the "club" stacker is located one position beyond where the separations are made by the "direct" separator gate 43 and the "club" separator gate 69. By way of example, if one "club" is followed by a second "club" the last magazine or mailing piece of the first "club" would not have time to pass both the "club" separator gate 69 and the "club" stacker gate 91 to be included with its proper club in the absence of this one cycle delay.

In many cases a "club" will be followed by a "direct." In such an event, relay 166 is energized by the newly actuated plunger 124 and its contact 174 will move to the opposite position. However, relay 162 will not be energized since there is no actuated plunger 124 at the triggering brush 138 at this time. Consequently, contact 163 is in the open position, and there can be no circuit to energize relay winding 257. Hence, the circuit to operate the "club" including lead 262, contact 263 and lead 264 will not be made and "direct" separator gate 43 will move to the raised position seen in FIG. 1, and the new group of "directs" will be diverted thereat.

If the "clubs" are followed by one or more "singles," "single" relay 169 is energized through "singles" brush 134 to open contact 263 to break the previously described circuit to the "club" stacker which is connected to lead 264, see also FIG. 2. This will prevent needless cycling each time a single is sensed in the system.

As the usual thing, the "club" stacker pocket 78 is cleared by the arrival of another "club" to the "club" separating station 45, and accordingly at the end of a run the last "club" will remain in its stacker pocket 78. In order to clear such stacker pocket a manually operated push button 274, see FIG. 2, is actuated, which closes a circuit from the 110 v. source to the stacker solenoid 204c. This can be done at any time to move the last stack of "clubs" to the club conveyor 88 to make the stack available for wrapping.

Referring back to the memory disk 103, the "singles" brush 134 has the circuit therethrough closed when an actuated plunger 124 is in any one of the three positions directly preceding the triggering position at the triggering brush 138. An actuated plunger for such "single," where such actuated plunger is in position at the single brush 134 would accordingly close circuits to the relays 168, 166 and 169. It will be remembered that relay 166 is already energized by reason of ring 126, brush 136 and club brush 132. When relay 168 is energized, its contact 173 closes a circuit by a lead 276 to a relay winding 277. Its contact 278 closes a circuit from the 110 v. source and including a lead 279 to a winding 281 of the solenoid air valve 182 to close the gate 68 so that the "singles" can move past both the "direct" and "club" separating stations 40 and 45.

As previously described, when relay 169 is energized its contact 263 will open, thereby opening the circuit to the "club" delay switch 267 and prevent cycling of the club stacker agate 91 and the club stacker ejector 63c.

When relay 166 is energized, its contact 174 will move to the other position shown thereby energizing relay 257. Its contact 258 will close a circuit from the 110 v. source including lead 259 the lining 261 to close the "direct" gate 43 as previously described so that the single can move past the "direct" separator station 40.

Means are provided to actuate the "direct" stacker ejector 63 in the event the last stack of a "direct" is not ejected at the end of a run. Such a function might take place in the event a "direct" was followed by a number of "singles" at the end of a run of "directs," and where the circuit to the auxiliary brush 136 was closed by an actuated plunger of a "single" at the same time the last actuated plunger on the counter disk 104 was in contact with the reset brush 157. Such a manually operated push button is shown in FIG. 2, and is denoted by the reference numeral 280 and closes a circuit from the 110 v. source through the solenoid winding 204d to initiate a cycle at the "direct" pusher.

From the description foregoing, it is believed evident that there has been provided a new and improved machine for applying address labels or other intelligence to mailing pieces such as magazines, newspapers or the like, and the so-labeled pieces being thereafter separated according to the destination thereof and according to the number of such pieces to go to such destinations. Furthermore, the mechanism described can accommodate any random combination or sequence of "directs," "clubs" and "singles" from a strip of labels. All that is necessary is that suitable sensing means cooperate with the label strip so that the separation can be made after the sensed label has been applied to an individual mailing piece.

The mechanism described herein includes for the most part mechanical devices, such as the memory disk and counter disk, since their operation can be more readily understood and serviced by the average operator or maintenance man, who in many cases does not have an understanding of complicated vacuum tube circuits. As a general thing, the speed at which a device of this kind would normally operate is such as probably to make unnecessary a high operating speed electronic circuit.

While the invention has been described in terms of a preferred embodiment thereof its scope is intended to be limited only by the claims here appended.

I claim:

1. In a machine for addressing magazines or the like and separating the same according to the number of said magazines within a classification, means for conveying said magazines, including indicia on said strip marking a change in classification, an address strip containing addresses thereon wherein each address is part of a classification having one or more addresses therein, means for applying an address to each magazine, means for sensing indicia on said address strip marking a change in classification, means cooperating with said indicia sensing means for storing a record of the change in classification and the counting the number within a classification, a plurality of stations whence said addressed articles are conveyed, the addressed articles being in accordance with the number in a particular classification, one of said stations being arranged to separate addressed articles in a classification composed of numbers in excess of a predetermined number, a second of said stations being arranged to separate articles in a classification composed of number in excess of a second predetermined amount and no more than said first mentioned predetermined number, and a third of said stations being arranged to separate articles in a classification totaling fewer in number than said second predetermined number, a gate at each of said first and second stations, one of said gates being movable to a position to divert the articles in a classification composed of numbers in excess of said second predetermined number and not more than said first mentioned predetermined number, and circuit means controlled by said sensing and record storing means for controlling the operation of said gates.

2. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing indicia on said address strip marking a change in classification, means cooperating with said indicia sensing means for storing a record of the change in classification and counting the number within a classification, a plurality of stations whence said addressed articles are conveyed and are separated in accordance with the number in a particular classification, one of said stations being arranged to separate addressed articles in a classification composed of numbers in excess of a predetermined number, a second of said stations being arranged to separate articles in a classification composed of numbers in excess of a second predetermined amount and not more than said first mentioned predetermined amount, and a third of said stations being arranged to separate articles totaling fewer in number than said second predetermined number, means at said first and second stations for stacking the articles received at a corresponding station, a gate at each of said first and second stations, said gates being movable to positions according to whether the articles are to be diverted at the first or second of said stations, and circuit means controlled by said sensing and record storing means for controlling the operation of said gates.

3. The invention as defined in claim 2 wherein a stacker gate is interposed at each station for holding a building stack, and wherein said record storing means controls the operation of said stacker gates.

4. The invention as defined in claim 3 wherein said record storing means actuates means for removing a completed stack whilst said stacker gate is in position holding a building stack.

5. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing indicia on said address strip marking a change in classification, means cooperating with said indicia sensing means for storing a record of the change in classification and counting the number within a classification, a plurality of stations whence said articles are conveyed and are separated in accordance with the number in a particular classification, one of said stations being arranged to separate labeled articles composed of numbers in excess of a predetermined number, a second of said stations being arranged to separate articles composed of numbers in excess of a second predetermined number and not more than said first mentioned predetermined number, and a third of said stations being arranged to separate articles totaling fewer in number than said second predetermined number, a gate at each of said first and second stations, both of said gates being movable to a position to divert the articles composed of numbers in excess of a predetermined number at the first station, and circuit means controlled by said sensing and record storing means for controlling the operation of said gates.

6. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing indicia on said address strip marking a change in classification, means cooperating with said indicia sensing means for storing a record of the change in classification and counting the number within a classification, a plurality of stations whence said articles are conveyed, the articles being separated at said stations in accordance with the number in a particular classification, one of said stations being arranged to separate articles composed of numbers in excess of a predetermined number, a second of said stations being arranged to separate articles composed of numbers in excess of a second predetermined number and not more than said first mentioned predetermined number, and a third of said stations being arranged to separate labeled articles totaling fewer in number than said second predetermined number, a gate at said first and second named stations for diverting said labeled articles to the third of said stations, and circuit means controlled by said sensing and record storing means for controlling the operation of said gates.

7. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing indicia on said address strip, means cooperating with said indicia sensing means for storing a record of the change in classification and counting the number within a classification, a plurality of stations whence said articles are conveyed and are separated in accordance with the number in a particular classification, one of said stations being arranged to separate articles composed of numbers in excess of a predetermined number, a second of said stations being arranged to separate articles composed of numbers in excess of a second predetermined number and not more than said first mentioned predetermined number, and a third of said stations being arranged to separate articles totaling fewer in number than said second predetermined number, means at said first and second stations for stacking the articles received at each such station, a gate at each of said first and second stations, said gates being movable to positions according to whether the articles are to be diverted at the first or the second of said stations, and means controlled by said sensing and record storing means for operating said gates and said stacking means.

8. The invention as defined in claim 7 wherein a stacker gate is provided at each station for holding a building stack.

9. The invention as defined in claim 8 wherein said sensing and record storing means actuates means for removing a completed stack whilst said stacker gate is in position holding a building stack.

10. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing indicia on said address strip, means cooperating with said indicia sensing means for storing a record of the change in classification and counting the number within a classification, a plurality of stations whence said articles are conveyed and are separated in accordance with the number in a particular classification, one of said stations being arranged to separate articles in a classification composed of numbers in excess of a predetermined number, a second of said stations being arranged to separate articles composed of numbers in excess of a second predetermined number and not more than said first mentioned predetermined number, and a third of said stations being arranged to separate articles totaling fewer in number than said second predetermined number, a gate at each of said first and second stations, one of said gates being movable to a position to divert the articles composed of numbers in excess of said second predetermined number and not more than said first mentioned predetermined number, and means responsive to said sensing and record storing means for controlling said gates.

11. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said indicia sensing means for storing a record of the change in classification and for counting the number within a classification, at least one station whence said magazines are conveyed, and means at said station for separating the magazines according to the number in a classification including means for diverting magazines of a classification containing numbers in excess of a predetermined amount.

12. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for the applying an address to each magazine, means for sensing the indicia on said address strip, means cooperating with said last named means for storing a record of the change in classification and for counting the number within a classification, at least one station whence said magazines are conveyed, and means at said station for separating the magazines according to the number within a classification, comprising means for diverting magazines of a classification containing numbers in excess of a predetermined amount, and circuit means including said sensing means and record storing means for controlling said diverting means.

13. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said last named means for storing a record of the change in classification and for counting the number within a classification, at least one station whence said magazines are conveyed, and means at said station for separating the magazines according to the number within a classification, including circuit means including said sensing means and recording means for controlling said separating means.

14. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said indicia sensing means for storing a record of the change in classification and for counting the number within a classification, at least one station whence said magazines are conveyed, and means at said station for separating the magazines according to the number within a classification consisting of magazines containing more than a first predetermined number and less than a second predetermined number.

15. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said indicia sensing means for storing a record of the change in classification and for counting the number within a classification, at least one station whence said magazines are conveyed, and means at said station for separating the magazines according to the number within a classification consisting of magazines containing more than a first predetermined number and less than a second predetermined number, and circuit means including said sensing means and said record storing means for controlling said separating means.

16. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said indicia sensing means for storing a record of the change in classification and for counting the number within a classification, and a separating station for separating the magazines according to the number in classifications determined by said sensing means and said record means.

17. In a machine for addressing magazines or the like and separating the same according to the number of said magazines within a classification, means for conveying said magazines, an address strip containing addresses thereon wherein each address is part of a classification having one or more addresses therein, including indicia on said strip marking a change in classification, means for applying an address to each magazine, means for sensing the indicia on said address strip, means cooperating with said indicia sensing means for storing a record of the change in classification and for counting the number within a classification, and a separating station for separating the magazines according to the number in classifications determined by said sensing means and said record means and circuit means including said sensing means and said record storing means for controlling the operation of said separating station.

References Cited in the file of this patent

FOREIGN PATENTS 1,109,479    France _________________ Sept. 28, 1952